United States Patent
Uramoto et al.

(10) Patent No.: US 6,311,198 B1
(45) Date of Patent: Oct. 30, 2001

(54) METHOD AND SYSTEM FOR THREADING DOCUMENTS

(75) Inventors: Naohiko Uramoto, Yokohama; Koichi Takeda, Machida, both of (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/130,503

(22) Filed: Aug. 6, 1998

(51) Int. Cl.$^7$ .................................................. G06F 15/00
(52) U.S. Cl. ................................ 707/530; 707/5; 707/538
(58) Field of Search .............................. 707/530, 5, 538

(56) References Cited

U.S. PATENT DOCUMENTS

| | | | |
|---|---|---|---|
| 5,745,893 | * 4/1998 | Hill et al. | 707/5 |
| 5,895,474 | * 4/1999 | Maarek et al. | 707/514 |
| 5,930,784 | * 7/1999 | Hendrickson | 707/2 |
| 5,931,907 | * 8/1999 | Davies et al. | 709/218 |
| 6,006,227 | * 12/1999 | Freeman et al. | 707/7 |
| 6,026,388 | * 2/2000 | Liddy et al. | 707/1 |

OTHER PUBLICATIONS

Tucker, Applied Combinatorics, 1995, John Wiley & Sons, Inc., pp. 110–111.*
Salton et al., Introduction to Modern Information Retrieval, MacGraw–Hill Book Company, pp. 215–250.*
Wilkinson, Stabillity of Reduction of a Matrix to Almost Triangular and Triangular Forms by Elementary Similarity Transformations, ACM, Jul. 1959, pp. 336–359.*
Sato et al., Fuzzy Clustering Model for Asymmetry and Self–Similarity, Fuzzy Systems, Proceedings of the Sixth IEEE Internationale Conference, Jul. 1997, pp. 963–968, vol. 2.*

* cited by examiner

Primary Examiner—Stephen S. Hong
Assistant Examiner—Cong-Lac Huynh
(74) Attorney, Agent, or Firm—Ronald L. Drumheller (57) ABSTRACT

In order to efficiently thread n chronologically ordered documents, a similarity among the n documents is calculated and the similarity is employed to create a similarity matrix using time constraints, and is converted into an adjacency matrix for identifying a relationship among the n documents. By applying this threading method that employs the time constraints, a large quantity of article data can be efficiently threaded in the O(n) order. Users can easily access a large quantity of data and can understand the contents.

13 Claims, 7 Drawing Sheets

FIG.1

$d_1$ : French Prime Minister, said the restarting of nuclear testing is necessary.
$d_2$ : Defence Minister suggests France will restart nuclear testing.
$d_3$ : Prime Minister at summit requests that France halt nuclear testing.
$d_4$ : China performs underground nuclear test, treaty negotiation may be held up.
$d_5$ : Foreign Minister Kohno denounces China for nuclear testing, and requests that France understand Japanese position.
$d_6$ : New Zealand Prime Minister requests that France not restart nuclear testing.
$d_7$ : French President announces the restarting of nuclear testing in September, eight tests through May of next year.
$d_8$ : France announces restarting of nuclear testing, affects nuclear reduction.
$d_9$ : France announces restarting of nuclear testing. Australia halts defence cooperation with France.
$d_{10}$ : France announces restarting of nuclear testing - U.S. expresses regret.

FIG.2

$$M = \begin{array}{c} \\ d_1 \\ d_2 \\ d_3 \\ d_4 \\ d_5 \\ d_6 \\ d_7 \\ d_8 \end{array} \begin{array}{c} \begin{array}{cccccccc} d_1 & d_2 & d_3 & d_4 & d_5 & d_6 & d_7 & d_8 \end{array} \\ \left[ \begin{array}{cccccccc} 0 & 1 & 0 & 1 & 0 & 0 & 0 & 0 \\ 0 & 0 & 1 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 1 & 0 & 0 \\ 0 & 0 & 0 & 0 & 0 & 0 & 0 & 0 \\ 0 & 0 & 0 & 0 & 0 & 0 & 0 & 1 \\ 0 & 0 & 0 & 0 & 0 & 0 & 0 & 0 \end{array} \right] \end{array}$$

FIG.3

FIG.4a  FIG.4b procedure MakeDistanceMatrix
for i = 2 to n begin
   if i - k < 1 then s ← 1 else s ← i - k
   for j = s to i - 1 begin
      a ( i, j ) ← sim($d_i$, $d_j$)
      j ← j + 1
   end
   i ← i + 1
end

$$S = \begin{matrix} & d_1 & d_2 & d_3 & d_4 & d_5 & d_6 & d_7 & d_8 & d_9 & d_{10} \\ d_1 & 0 & .309 & .239 & .072 & .131 & .319 & 0 & 0 & 0 & 0 \\ d_2 & 0 & 0 & .159 & .072 & .131 & .319 & .197 & 0 & 0 & 0 \\ d_3 & 0 & 0 & 0 & .056 & .103 & .498 & .103 & .124 & 0 & 0 \\ d_4 & 0 & 0 & 0 & 0 & .186 & .056 & .046 & .056 & .046 & 0 \\ d_5 & 0 & 0 & 0 & 0 & 0 & .102 & .085 & .102 & .128 & .096 \\ d_6 & 0 & 0 & 0 & 0 & 0 & 0 & .154 & .176 & .206 & .209 \\ d_7 & 0 & 0 & 0 & 0 & 0 & 0 & 0 & .308 & .320 & .323 \\ d_8 & 0 & 0 & 0 & 0 & 0 & 0 & 0 & 0 & .257 & .279 \\ d_9 & 0 & 0 & 0 & 0 & 0 & 0 & 0 & 0 & 0 & .287 \\ d_{10} & 0 & 0 & 0 & 0 & 0 & 0 & 0 & 0 & 0 & 0 \end{matrix}$$

| | $d_1$ | $d_2$ | $d_3$ | $d_4$ | $d_5$ | $d_6$ | $d_7$ | $d_8$ | $d_9$ | $d_{10}$ |
|---|---|---|---|---|---|---|---|---|---|---|
| Input order count | 0 | 1 | 1 | 0 | 1 | 2 | 1 | 1 | 2 | 2 |
| Output order count | 2 | 2 | 1 | 1 | 0 | 0 | 3 | 1 | 1 | 0 |

FIG.10 procedure GetMaxPath(A)
// GetMaxPath[ i ] for $d_i$, A is a set of arcs.

for i = 1 to n begin MaxPath[ i ] ← NULL end
for j = 1 to n begin
  for i = j - k to j - 1 begin
    if ( d i, d j) ∈ A then
      if length(MaxPath[ j ] ) < Length(MaxPath[ i ] ) + 1
        then MaxPath[ j ] ← Connect (MaxPath[ i ], ($d_i$, $d_j$))
    i←i + 1
  end
  j←j + 1
end procedure Lengh( path )
returns the number of arcs in path procedure Connect( path )
if path = ( $d_0$ .... $d_i$ ) and arc = ( $d_i$, $d_j$), then
return ( $d_0$.... $d_i$, $d_j$ ) .

METHOD AND SYSTEM FOR THREADING DOCUMENTS

DESCRIPTION

1. Field of the Invention

The present invention relates to a method for threading documents, and in particular to a method for efficiently threading documents, such as newspaper articles, that appear in chronological order and for representing the documents in a directed graph, and to a technology for efficiently representing and visualizing the characteristics of a set of documents by employing a directed graph.

2. Related Art

Recently, various documents have come to be distributed electronically. Ordinary users can read multiple documents, such as articles presented in newspapers and on TV news programs, related to topics in the chronological order in which they appear. Conventionally, a document clustering method is employed as the method for threading a plurality of documents. According to this method, basically, a similarity between two of the multiple documents is calculated to create a cluster. For example, for ranking type clustering, on the order of $O(n^2)$ calculations are required. When n is a greater number, a large calculation cost is required. If, for example, a company, such as a newspaper company, that has a database in which multiple articles are stored desires to collect information relating to a specific article using the ordinary clustering method, an unrealistic period of time of over one year is required.

SUMMARY OF THE INVENTION

It is one object of the present invention to provide a method and a system for efficiently threading a large quantity of article data (documents).

It is another object of the present invention to provide a method and a system for threading a large quantity of article data at high speed.

It is an additional object of the present invention to provide a method and a system for threading in $O(n)$ order a large quantity of article data.

It is a further object of the present invention to provide a system for threading a large quantity of article data at high speed and for displaying a relationship among the articles so that users can easily understand it.

It is a further object of the present invention to provide a method and a system by which a user can easily access a large quantity of threaded data and understand the contents.

To achieve the above objects, according to the present invention, for threading n chronologically ordered documents, a method is provided whereby a similarity among the n documents is calculated and the similarity is employed to create a similarity matrix using time constraints, and is converted into an adjacency matrix for identifying a relationship among the n documents.

By applying the threading method that employs the time constraints, a large quantity of article data can be efficiently threaded in the $O(n)$ order. Users can easily access the large quantity of data and can understand the contents.

DESCRIPTION OF THE PREFERRED EMBODIMENTS

Figure 13:
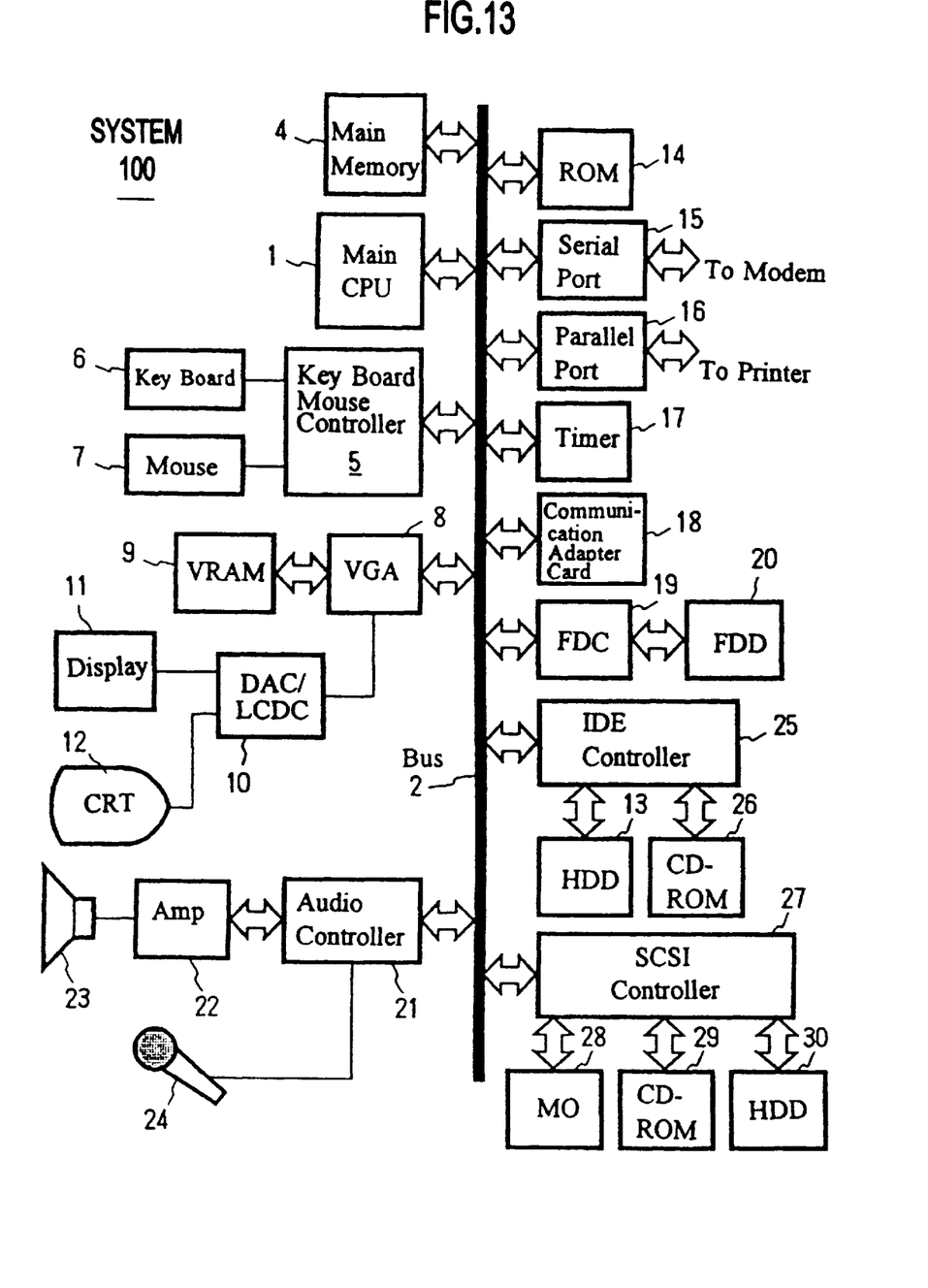
FIG. 13 is a diagram illustrating an example hardware arrangement of a document threading system.

The preferred embodiment of the present invention will now be described while referring to the drawings. FIG. 13 is a schematic diagram illustrating an example hardware arrangement of a system used for this invention. A system 100 includes a central processing unit (CPU) 1 and a memory 4. The CPU 1 and the memory 4 communicate by a bus 2 with a hard disk drive 13, which is employed as an auxiliary storage device. A floppy disk drive (or a driver for a memory medium such as an MO or a CD-ROM) 20 is connected to the bus 2 via a floppy disk controller 19.

A floppy disk (or a memory medium such as an MO or a CD-ROM) is inserted into the floppy disk drive 20. Code for a computer program cooperating with an operation system for issuing commands to the CPU 1 and for executing the present invention can be recorded on the floppy disk and the hard disk drive 13, and in the ROM 14. The computer program code is loaded in the memory 4 and executed. The computer program code can be compressed, or divided into a plurality of code sets, which can be stored on a plurality of memory mediums.

The system 100 further includes user interface hardware components, such as a pointing device (a mouse or a joystick) 7 or a keyboard 6 for inputting data, and a display 12 for providing visual data for a user. A printer and a modem can be respectively connected by means of a parallel port 16 and a serial port 15. The system 100 can be connected to a network by means of the serial port 15 and a modem or a communication adaptor 18 (the ethernet or a token ring card) for communication with another computer.

A loudspeaker 23 receives from an amplifier 22 an audio signal that is obtained by D/A (digital/analog) conversion at an audio controller 21, and outputs it as sound. The audio controller 21 performs the A/D (digital/analog) conversion of information received from a microphone 24 to obtain external audio information for the system 100.

From the above description, it would be easily understood that the system in the present invention can be realized by common personal computers (PCs), workstations, notebook PCs, palmtop PCs, network computers, various home electronic appliances, such as televisions incorporating a computer, game machines that include a communication function, and communication terminals, such as telephones, facsimile machines, portable telephones, PHSs and electronic notebooks, or a combination of them. The above described components are merely examples, however, and not all of them are required to accomplish the present invention.

Figure 1:
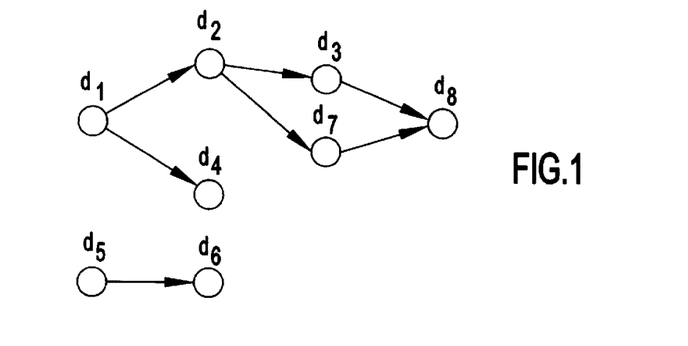
FIG. 1 is a diagram showing a directed graph G.

A set of articles used in this invention and a definition of a graph will now be explained. A set V of articles is represented by a set whose elements are chronologically ordered:

$$V=\{d_1, d_2, \ldots, d_n\}$$

wherein subscripts 1, 2, . . . and n represent the chronological order. According to this, article $d_i$ appeared before article $d_{i+1}$. The set of threaded articles is defined by a directed graph (V, A). V denotes an article (node) set, and A is a set consisting of a pair of two nodes (i, j) (i and j are elements of the set V). In FIG. 1 is shown an example directed graph. At this time, (V, A) is represented as follows:

$$V=\{d_1, d_2, d_3, d_4, d_5, d_6, d_7\}$$

$$A=\{(d_1,d_2), (d_2,d_3), (d_1,d_4), (d_5,d_6), (d_2,d_7), (d_3,d_8), (d_7,d_8)\}$$

Since the node set is in chronologically order, the following constraint can be added to the graph:

Condition constraint (constraint 1)

For $(d_i,d_j) \in A$, i<j.

This constraint indicates an old article can not be threaded with a new article.

Figure 3:
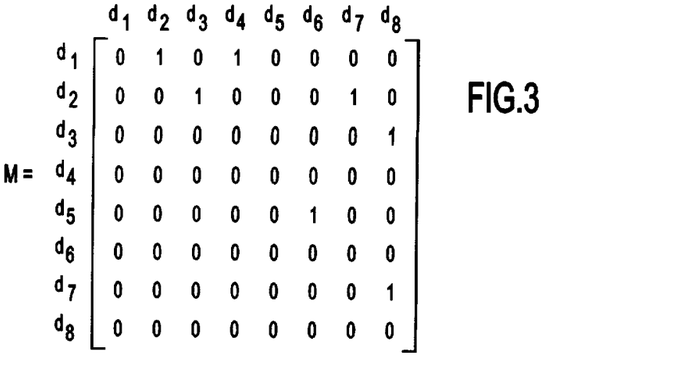
FIG. 3 is a diagram showing an adjacency matrix $M_G$ for G.

An explanation will now be given of how a graph structure indicating a relationship among articles should be built from a set of articles. The directed graph is called an adjacency matrix and is formed by using a matrix describing the adjacency among the nodes. In the present invention, the set of articles is expressed using a graph by forming the adjacency matrix. For example, in FIG. 3 is shown adjacency matrix $M_G$ for graph G shown in FIG. 1.

Value 1 of element (1, 2) in the matrix represents $(1, 2) \in A$, i.e., the presence of a link from $d_1$ to $d_2$. Procedures for threading articles are as follows:

1. Calculate a similarity between articles.
2. Create a similarity matrix.
3. Convert the similarity matrix into an adjacency matrix.

Figure 2:
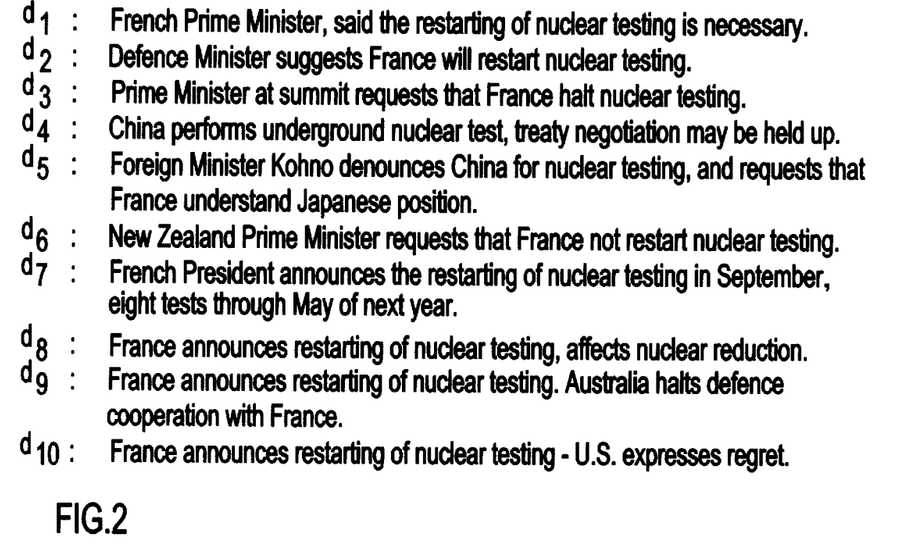
FIG. 2 is a diagram showing set V of articles related to nuclear tests.

These procedures will be described by employing a set of articles in FIG. 2 (articles related to nuclear tests extracted from the Nikkei Newspaper)

The arithmetic functions used for the calculation of a similarity between articles will be explained.

Function $sim(d_i,d_j)$ is a similarity calculation function based on the matching of words contained in articles. Basically, a Salton's vector spatial model is employed (see "Automatic Information Organization and Retrieval," Gerard Salton, New York, N.Y.: McGraw-Hill) As for words, the text of an article is morphologically analyzed, and nouns and verbs are extracted. The term sim is defined as follows:

$$sim(di, dj) = \frac{\sum_{kw} w_{kw}^{di} w_{kw}^{dj} g_{kw}^{di}}{\sqrt{\sum_{kw} w_{kw}^{di^2}} \sqrt{\sum_{kw} w_{kw}^{dj^2}}}$$

$w_{kw}^{d_i}$ denotes a weight relating to word kw in $d_i$. For the calculation of the weight, a corrected TF·IDF value is employed (see "Relevance Weighting of Search Terms," S. E. Robertson and K. Sparck Jones, JASIS, pp. 129 to 146, Vol. 27, 1976). $g_{kw}^{d_i}$ is a weight when kw is a differentia word of $d_i$.

$$w_{kw}^{di} = \frac{Cdj(kw)}{Cdi} \cdot \log \frac{k}{Nk(kw)}$$

A differentia word is a word in a node (article) that does not appear in k preceding articles (k is a constant). A differentia word can be obtained by calculating function differentia($d_i$).

$$differentia(di) = \{kw / Cdi(kw) > 0,$$

and for all di, where $i - k < l < i$, $Cdi(kw) = 0\}$ $$g_{kw}^{di} = \begin{cases} 1.5 & kw \in differentia(di) \\ 1 & otherwise \end{cases}$$

Other parameters are as follows:

k: constant $C_{di}(kw)$: frequency of kw in $d_i$ $C_{di}$: total word count in $d_i$ $N_k(kw)$: count of articles including kw among k articles, $d_{i-k}, \ldots$ and $d_i$ A similarity matrix is created by using the sim function defined above. Since, in the conventional ranking clustering, a similarity between two documents must be calculated, the sim function must be repeated n(n−1)/2 times. This requires on the order of $O(n^2)$ calculations, and when n is a large number, the number of calculations is increased. In this invention, since the following constraints are set, an algorithm employed for creating a similarity matrix is performed on the order of O(n) calculations (see FIG. 5).

Time constraint (constraint 2)

For $(d_i,d_j) \in A$, j−(k+1)<i<j

The limiting factor provided by this constraint is that only the preceding k articles can be referred to for one article. According to this constraint, the repetition count for the sim function is reduced to k×n. From the view of the threading of articles by meaning, related articles appear during a specific period of time, and after a certain period of time has elapsed, rather than the previous topic being continued, a new topic appears.

Figure 4A:
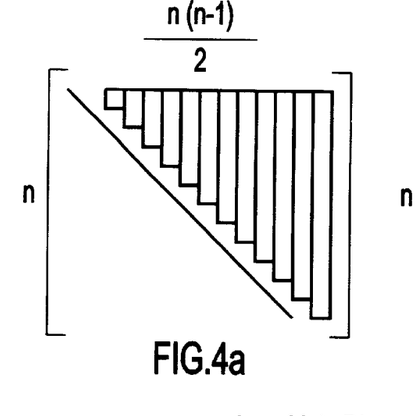
FIG. 4 is a diagram showing a comparison of the amounts of calculations between case (a), where no condition constraint is added, and case (b) where a condition constraint is added.
Figure 4B:
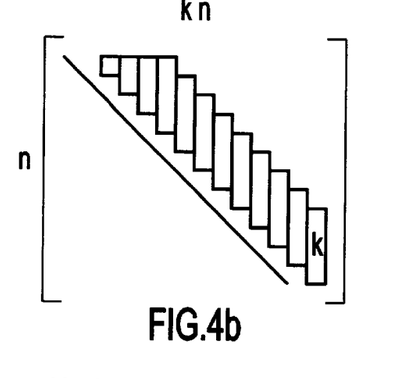

In FIG. 4 is shown a visual comparison of the amounts of calculations required by the conventional clustering method and by the method proposed in the present invention.

Figure 5:
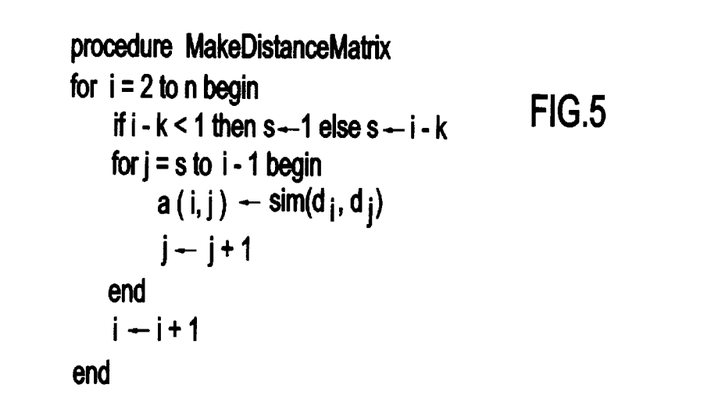
FIG. 5 is a diagram showing an algorithm for acquiring a similarity matrix.
Figure 12:
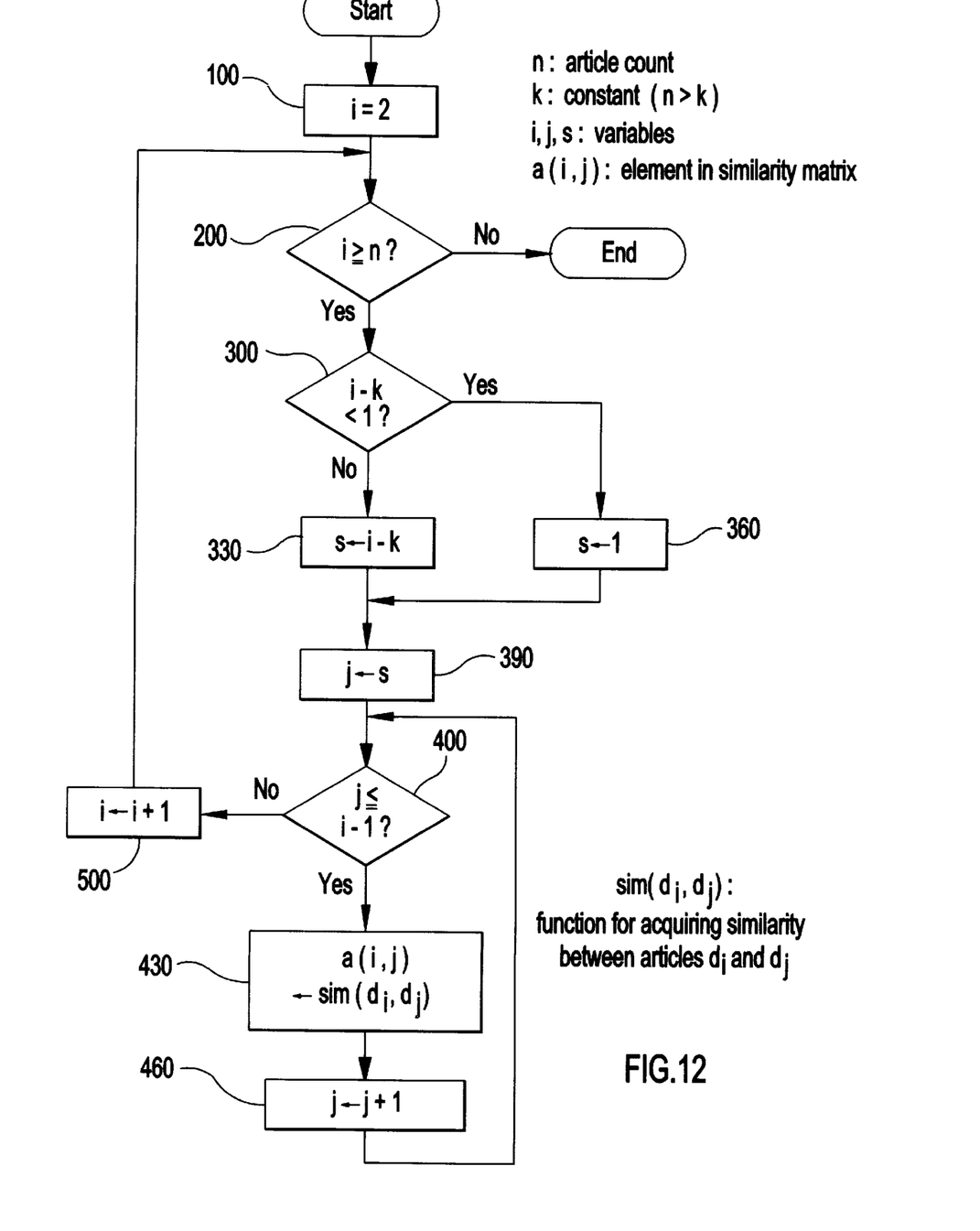
FIG. 12 is a flowchart showing an algorithm for acquiring an adjacency matrix.

The flowchart for the algorithm in FIG. 5 is shown in FIG. 12. In FIG. 12, n denotes an article count; k, a constant smaller than n; i, j and s, variables; and a(k, j), an element of an n×n similarity matrix.

First, at step 100, the initial value of variable i is set to 2, and at step 200, a check is performed to determine whether the variable i is equal to or smaller than n. When the decision is No, the processing is terminated.

When the decision at step 200 is Yes, at step 300 a check is performed to determine whether i−k is smaller than 1. If the decision is Yes, 1 is substituted into variable s. If the decision is No, i−k is substituted into the variable s. At step 390, the variable s is substituted into variable j. The processes at steps 300 to 390 are those for obtaining a variable j that is equal to or greater than 1 and i−k.

Figure 6:
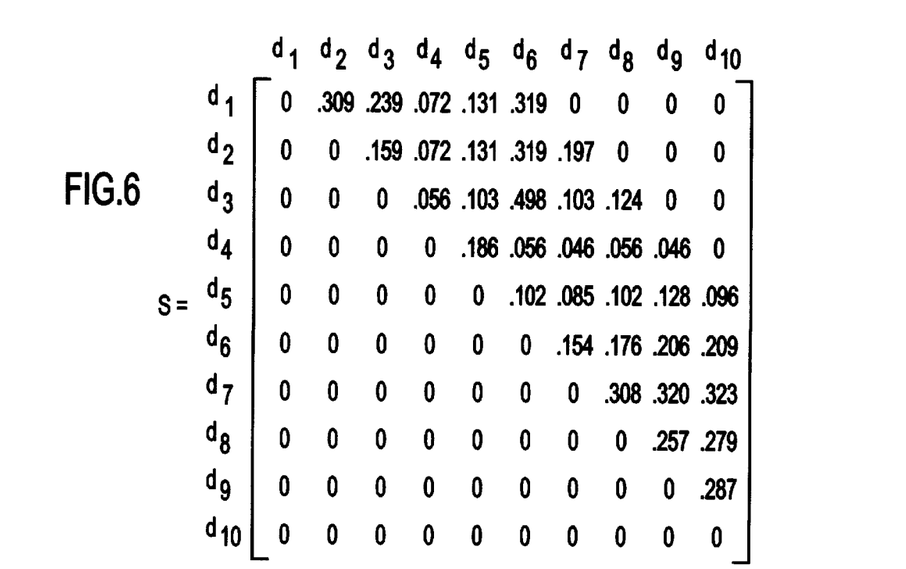
FIG. 6 is a diagram showing similarity matrix S.

At step 400, a check is performed to determine whether j is equal to or smaller than i−1. If the decision is No, at step 500 the variable i is incremented by one, and program control returns to step 200. If the decision is Yes, at step 430 the value of the sim function $(d_i, d_j)$, which represents a similarity between articles $d_i$ and $d_j$, is substituted into a similarity matrix $a(i, j)$. At step 460, the variable j is incremented by one, and program control returns to step 400. The similarity matrix is created by using the above described algorithm. Similarity matrix S of set V obtained by the above method is shown in FIG. 6.

Figure 7:
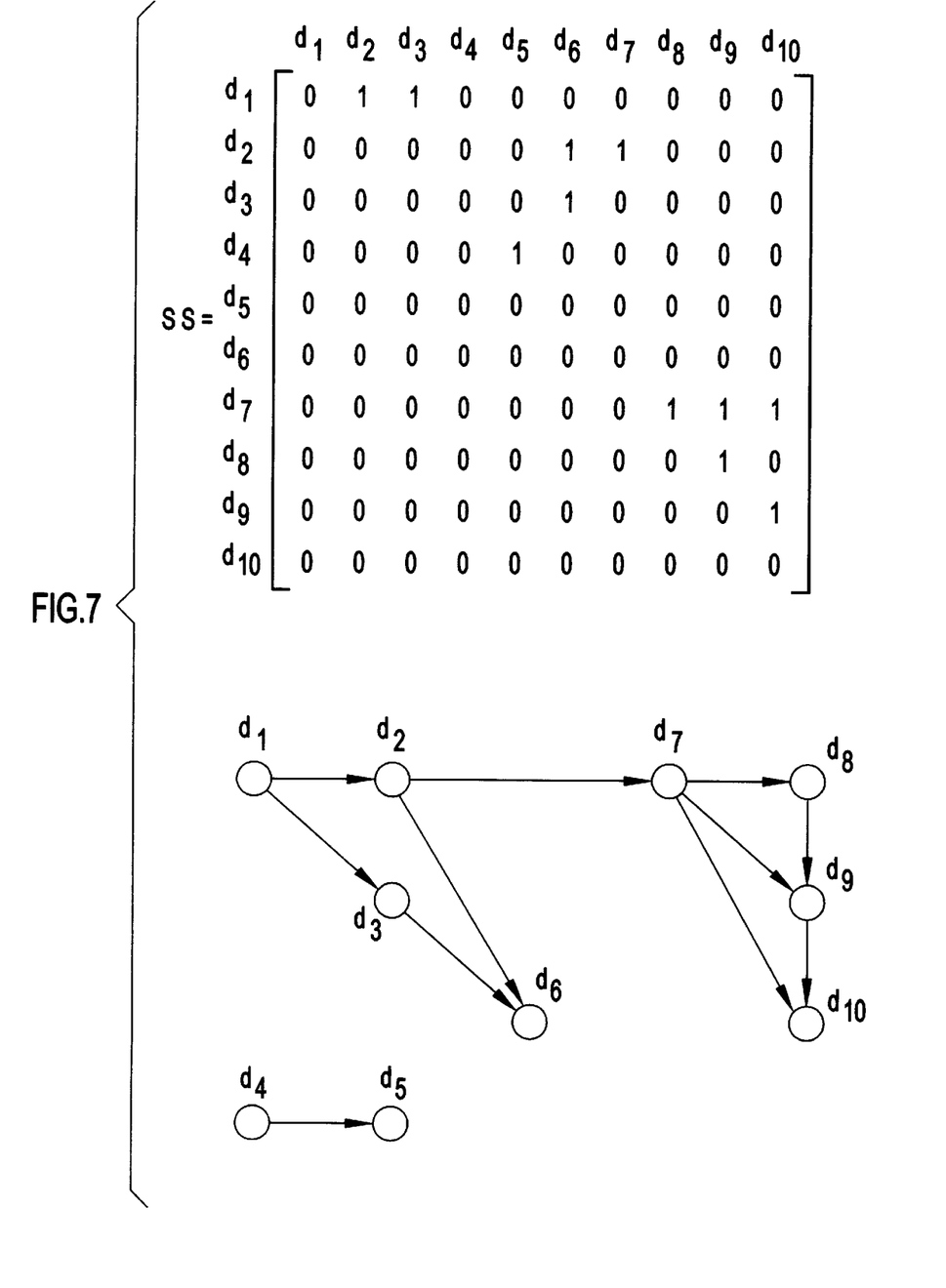
FIG. 7 is a diagram showing adjacency matrix SS.

An adjacency matrix SS is created by converting the similarity matrix S obtained by the above method. In this embodiment, from among several conversion definitions, element $ss(i, j)$ of SS is $s(i, j)>0.18$, and it is assumed that value 1 is established when the constraint is satisfied whereby one article is threaded with k/2 articles. In FIG. 7 is shown an adjacency matrix SS, which is the result of the conversion.

Figure 8:
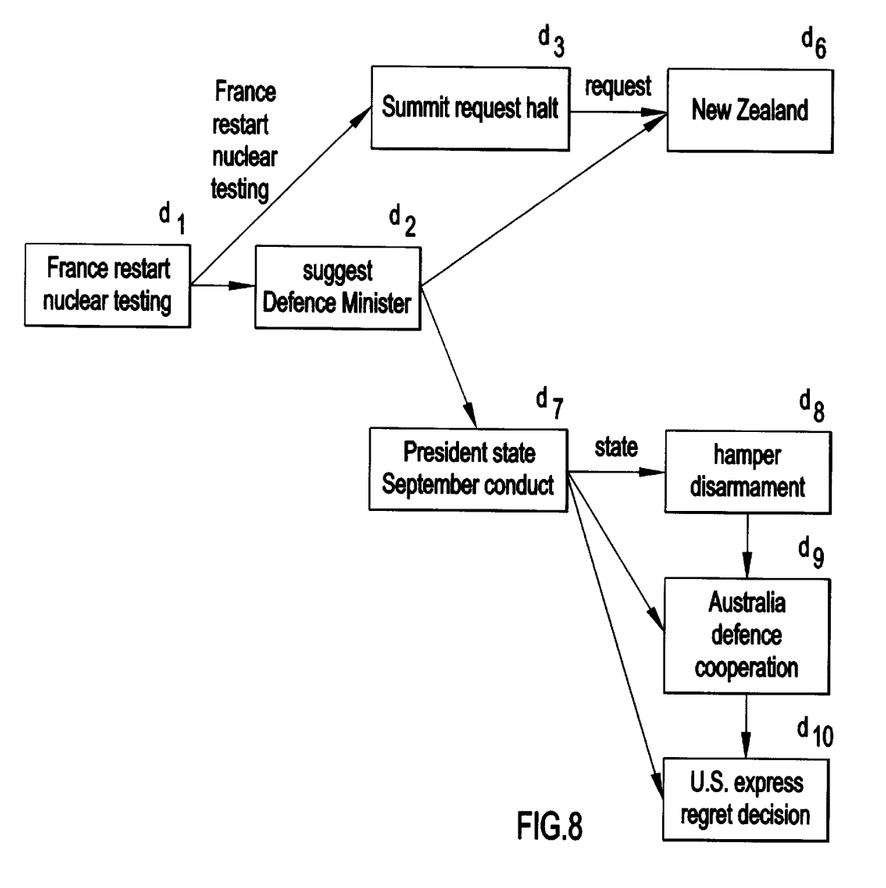
FIG. 8 is a diagram showing graph $G_1$ for set V.
Figure 9:
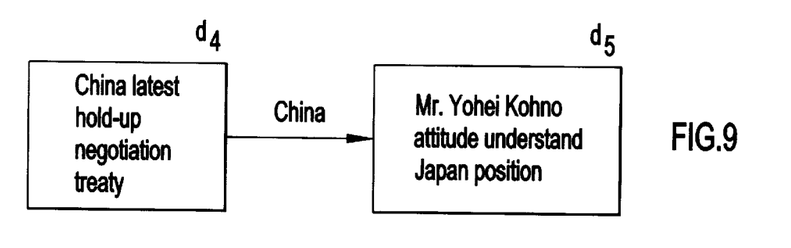
FIG. 9 is a diagram showing a graph that visualizes graph $G_1$.

Finally, the directed graph for V is formed as shown in FIG. 8. The result obtained by visualizing the contents of the articles is shown in FIG. 9. As an example, the result shown in FIG. 9 is displayed on the display device 11 or the CRT 12 in FIG. 13. The region to be displayed may constitute the entire relationship among the documents, or one part of the relationship as needed. The relationship among the documents may be printed through the parallel port 16.

In the graph there are two linking elements (threads). One is a topic related to the restarting of nuclear testing in France, and the other is a topic related to the nuclear testing performed by China contrary to the test ban. The thread for "France" includes two sub-threads: one is the reaction to the suggestion that the testing be restarted, and the other is the reaction to the official announcement that the testing will be restarted. A node from which a plurality of external arcs are output indicates that a topic represented by that node is important, and a plurality of articles are related to the topic.

As one example, the number of the external arcs (linking portions) is determined to constitute the degree of importance of a topic in the document relation graph, and the display form for the topic is changed and displayed on the display device 11 or the CRT 12. The methods for altering the display form can be the changing of the display attribute (color, luminance, etc.) of a thread that includes an important topic, the increasing of the display size of the thread compared with other threads, the altering of the display position of the thread so that it is moved to the center of the screen, or a combination of these methods.

In FIG. 8 portions enclosed by rectangles represent individual articles. If a word in a specific article is a differentia word for an article that is linked with a specific article, the word can be regarded as a point indicating the start of a new topic in the thread. For example, "state," which is a differentia word for $d_7$, appears in $d_8, d_9, d_{10}$, which are linked together. In other words, while the thread itself is a topic related to the keywords "France" and "nuclear testing," a new topic "state" has appeared. These words are called topic words and are printed in bold face in FIG. 8.

As one example, these topic words are determined as points where new topics have appeared in the document relationship graph, and are displayed differently from other words on the display device 11 or the CRT 12. The display attribute of the topic words, for example, may be changed in the above described manner. The display attribute (color, luminance, etc.) of a thread that includes the topic word may be changed, the display size of the thread may be increased compared with other threads, or the display position of the thread may be changed so that it is positioned in the center of a display screen. Or, a combination of them may be employed. The display of the topic word can be performed by using any of the above methods, without departing from the essence of the present invention.

In the above examples, a specified thread that is displayed is selected for displaying the article (document) that is the contents of the thread. As a result, a user can identify not only the relationship relative to the article (document) but also the contents of the article.

The set of articles represented as a graph can be expressed as characteristics for the graph, such as an input (output) order count, paths, and cycles.

Figure 10:
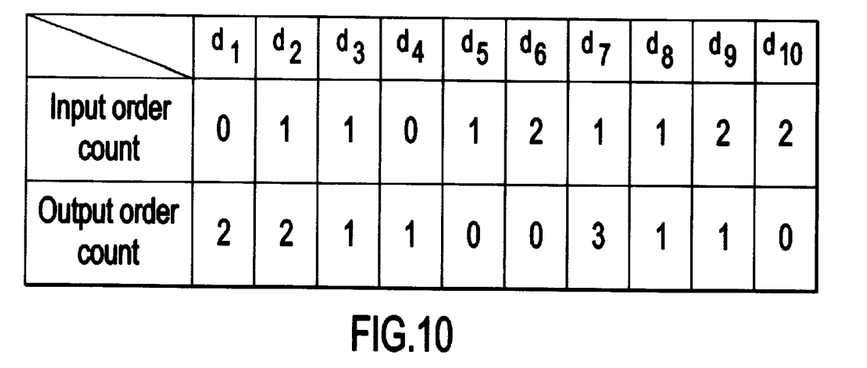
FIG. 10 is a table for input and output order counts for graph $G_1$.

The input order count for a specific node is the number of arcs directed to the node, and the output order count is the number of arches output from the node. The input order count for $d_i$ can be obtained by adding the values of elements in the i-th row of an adjacency matrix, and the output order count can be obtained by adding the value of elements in the i-th column. In FIG. 10 is shown the order number count for each article. The output order count indicates the degree of activity of the topic of the node. In FIG. 10, for example, the article having the largest output order count is $d_7$. This relates to the first official announcement in France concerning the restarting of nuclear testing, and the many articles that appeared concerning this topic.

The input order count probably has the following two meanings. First, one case is where an article includes a plurality of topics. The article is not sorted as one related to a specific topic, but is employed in common by a set of articles encompassing a plurality of topics. The other case is where a plurality of articles are closely related to each other and are interlinked. In many cases, a cycle is formed between these articles.

A path from a node (article) to another node represents "a content flow" constituted by articles situated along the path. A presence of a plurality of paths between two nodes indicates that there is a plurality of flows. For example, the shortest path $(d_1, d_2, d_7, d_{10})$ between $d_1$ and $d_{10}$ can be used to quickly apprehend the flow of the content, and the longest path $(d_1, d_2, d_7, d_8, d_9, d_{10})$ is adequate for tracing the flow of detailed contents, including related articles.

The length of the path can be used to determine whether a node belongs to the main stream of a topic that is expressed in its thread. For example, the longest path for $d_6$ is length 3, while the longest path for $d_7$ is 5. In this case, $d_7$ is closer to the main topic. On the other hand, articles related to $d_6$ did not continue and thus the path was not extended.

Figure 11:
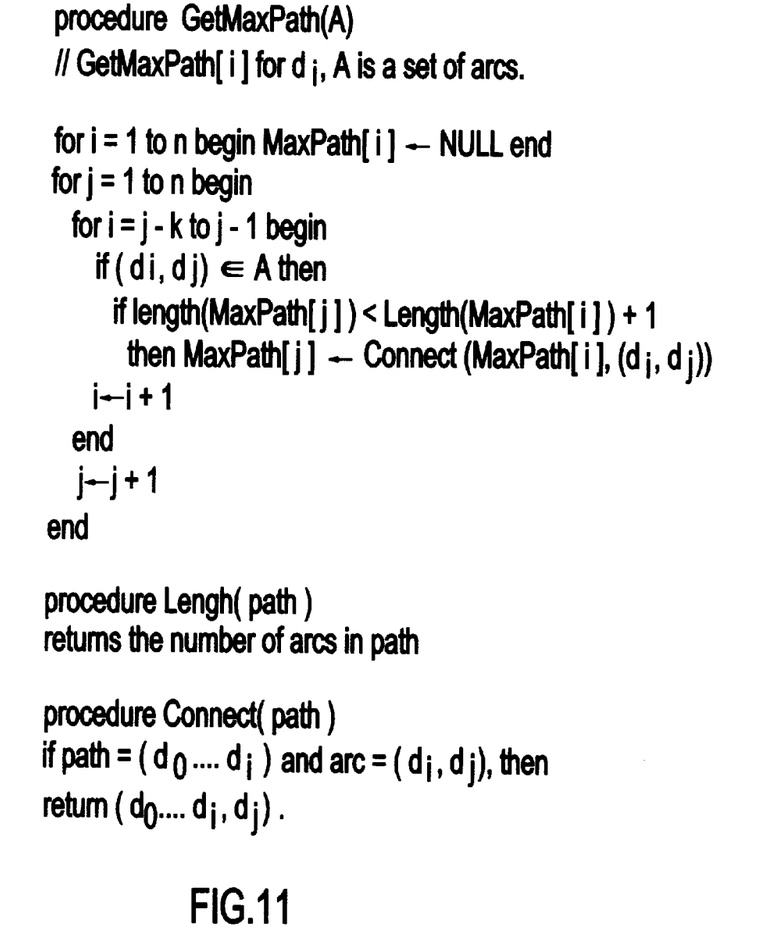
FIG. 11 is a diagram showing an algorithm for acquiring the longest path.

In FIG. 11 is shown an algorithm for efficiently acquiring the longest path having a node at its end point. The number of calculations for node count n is O(n). This is because, in accordance with the time constraint (constraint 2), the number of arcs is kn (k is a constant).

A cycle between articles will now be described. The presence of a cycle indicates a plurality of articles concerning a specific topic are closely related to each other. For example, $(d_7, d_8, d_9, d_{10})$ is a cycle for the topic "state." When the size of the cycle is reduced, the number of nodes in the graph can be reduced. This means that the graph can be used to summarize the thread.

As is described above, since the time constraints are introduced, a large quantity of article data can be efficiently threaded in O(n) order, so that a user can easily access the large amount of data and can understand the contents.

What is claimed is:

1. A method for threading n chronologically ordered documents, said method comprising the steps of:

(1) calculating a similarity only between pairs of said n documents which satisfy a time constraint, said time constraint being that the documents of a pair are chronologically separated from each other by no more than a predetermined extent;

(2) creating a similarity matrix from said calculated similarities; and (3) converting said similarity matrix into an adjacency matrix for identifying a relationship existing among said n documents, whereby a set V of said n chronologically ordered documents is represented as $$V=\{d_1, d_2, \ldots, d_n\},$$

a set A consisting of pairs of said n documents being represented as $$A=\{(d_i, d_j) | d_i \in V, d_j \in V, i<j\}, \text{ and}$$

said time constraint being represented as $$\forall (d_i, d_j) \in A, j-(k+1)<i<j,$$

where k is a constant.

2. A system for threading n chronologically ordered documents, said system comprising:

(1) means for calculating a similarity only between pairs of said n documents which satisfy a time constraint, said time constraint being that the documents of a pair are chronologically separated from each other by no more than a predetermined extent;

(2) means for creating a similarity matrix from said calculated similarities; and (3) means for converting said similarity matrix into an adjacency matrix for identifying a relationship existing among said n documents, wherein a set V of said n chronologically ordered documents is represented as $$V=\{d_1, d_2, \ldots, d_n\},$$

a set A consisting of pairs of said n documents being represented as $$A=\{(d_i, d_j) | d_i \in V, d_j \in V, i<j\}, \text{ and}$$

said time constraint being represented as $$\forall (d_i, d_j) \in A, j-(k+1)<i<j,$$

where k is a constant.

3. A system for threading n chronologically ordered documents and for displaying said threaded n documents, said system comprising:

(1) means for calculating a similarity only between pairs of said n documents which satisfy a time constraint, said time constraint being that the documents of a pair are chronologically separated from each other by no more than a redetermined extent;

(2) means for creating a similarity matrix from said calculated similarities;

(3) means for converting said similarity matrix into an adjacency matrix for identifying a relationship existing among said n documents; and (4) means for displaying said relationship as one or more threads, one part or all of said documents represented by said threads being related based on said adjacency matrix, wherein a set V of said n chronologically ordered documents is represented as $$V=\{d_1, d_2, \ldots, d_n\},$$

a set A consisting of pairs of said n documents being represented as $$A=\{(d_i, d_j) | d_i \in V, d_j \in V, i<j\}, \text{ and}$$

said time constraint being represented as $$\forall (d_i, d_j) \in A, j-(k+1)<i<j,$$

where k is a constant.

4. The system according to claim 3, further comprising:

(5) means for altering display forms of said threads in accordance with a number of connections with other threads, and for displaying said relationship among said threads.

5. The system according to claim 3, further comprising (5) means for, during a display of said relationship among said threads, displaying a new topic, appearing in said threads, in a display form differing from other topics.

6. The system according to claim 3, further comprising (5) means for, during a display of said relationship among said threads, displaying a thread including a new topic, appearing in said threads, in a display form differing from that of other threads.

7. The system according to claim 3, further comprising:

(5) means for displaying a document in accordance with a specific thread selected for a display of said relationship among said threads.

8. A memory medium including a program for threading n chronologically ordered documents, said program comprising:

(1) a function for calculating a similarity only between pairs of said n documents which satisfy a time constraint, said time constraint being that the documents of a pair are chronologically separated from each other by no more than a predetermined extent;

(2) a function for creating a similarity matrix from said calculated similarities; and (3) a function for converting said similarity matrix into an adjacency matrix for identifying a relationship existing among said n documents, wherein a set V of said n chronologically ordered documents is represented as $$V=\{d_1, d_2, \ldots, d_n\}$$

a set A consisting of pairs of said n documents being represented as $$A=\{(d_i, d_j) | d_i \in V, d_j \in V, i<j\}, \text{ and}$$

said time constraint being represented as $$\forall (d_i, d_j) \in A, j-(k+1)<i<j,$$

where k is a constant.

9. A memory medium including a program for threading n chronologically ordered documents and for displaying said threaded documents, said program comprising:

(1) a function for calculating a similarity only between pairs of said n documents which satisfy a time constraint, said time constraint being that the documents of a pair are chronologically separated from each other by no more than a predetermined extent;

(2) a function for creating a similarity matrix from said calculated similarities;

(3) a function for converting said similarity matrix into an adjacency matrix for identifying a relationship existing among said n documents; and (4) a function for displaying said relationship as one or more threads, one part or all of said documents represented by said threads being related based on said adjacency matrix, wherein a set V of said n chronologically ordered documents is represented as $$V=\{d_1, d_2, \ldots, d_n\},$$

a set A consisting of pairs of said n documents being represented as $$A=\{(d_i, d_j)|d_i \epsilon V, d_j \epsilon V, i<j\}, \text{ and}$$

said time constraint being represented as $$\forall (d_i, d_j) \epsilon A, j-(k+1)<i<j,$$

where k is a constant.

10. The memory medium according to claim 9, wherein said program further comprises:

(5) a function for altering display forms of said threads in accordance with a number of connections with other threads, and for displaying said relationship among said threads.

11. The memory medium according to claim 9, wherein said program further comprises:

(5) a function for, during a display of said relationship among said threads, displaying a new topic, appearing in said threads, in a display form differing from other topics.

12. A memory medium according to claim 9, wherein said program further comprises:

(5) a function for, during a display of said relationship among said threads, displaying a thread including a new topic, appearing in said threads, in a display form differing from that of other threads.

13. The memory medium according to claim 9, said program further comprising:

(5) a function for displaying a document in accordance with a specific thread that is selected for a display of said relationship among said threads.

* * * * *